(12) United States Patent
Borgerson et al.

(10) Patent No.: US 9,384,456 B2
(45) Date of Patent: Jul. 5, 2016

(54) SYSTEM AND METHOD FOR GENERATING COMMODITY FLOW INFORMATION

(75) Inventors: Scott G. Borgerson, New London, CT (US); G. Rockford Weitz, Cambridge, MA (US); Douglas A. Raymond, San Francisco, CA (US)

(73) Assignee: CargoMetrics Technologies, LLC, Boston, MA (US)

( * ) Notice: Subject to any disclaimer, the term of this patent is extended or adjusted under 35 U.S.C. 154(b) by 1037 days.

(21) Appl. No.: 12/997,295

(22) PCT Filed: Jun. 25, 2009

(86) PCT No.: PCT/US2009/048545
§ 371 (c)(1),
(2), (4) Date: May 27, 2011

(87) PCT Pub. No.: WO2009/158445
PCT Pub. Date: Dec. 30, 2009

(65) Prior Publication Data
US 2011/0215948 A1   Sep. 8, 2011

Related U.S. Application Data

(60) Provisional application No. 61/076,317, filed on Jun. 27, 2008, provisional application No. 61/120,136, filed on Dec. 5, 2008, provisional application No. 61/159,854, filed on Mar. 13, 2009, provisional application No. 61/162,008, filed on Mar. 20, 2009.

(51) Int. Cl.
*G08G 1/123* (2006.01)
*G06Q 10/08* (2012.01)
*B63B 25/28* (2006.01)
*B61L 3/00* (2006.01)

(52) U.S. Cl.
CPC ............ *G06Q 10/08* (2013.01); *B61L 3/006* (2013.01); *B63B 25/28* (2013.01)

(58) Field of Classification Search
CPC ...... B61L 3/006; B61L 2205/04; B63B 25/28
USPC .................... 340/991, 989, 933; 701/117
See application file for complete search history.

(56) References Cited

U.S. PATENT DOCUMENTS

| | | | |
|---|---|---|---|
| 2006/0058941 A1* | 3/2006 | DeKock et al. | 701/117 |
| 2007/0008135 A1* | 1/2007 | Sajkowsky | 340/572.1 |
| 2008/0088485 A1* | 4/2008 | Stolte et al. | 340/991 |

OTHER PUBLICATIONS

International Search Report of PCT/US2009/048545 dated Feb. 5, 2010.

* cited by examiner

*Primary Examiner* — Shirley Lu (57) ABSTRACT

This invention provides a global strategic picture of commodity movements generated by tracking ships from satellite and other sources and then combining ship location and movement information with at least one other data set, such as vessel, port, cargo, weather, or market data. Ship positions are integrated with other data, such as vessel, port, cargo, weather, and market information, to create a global strategic picture of commodity flows. A global strategic picture may then be generated by combining (i) ship movements gathered by satellite and other sources, with (ii) vessel, port, cargo, weather, market, and other data from existing sources, and (iii) a time history of these data sets.

24 Claims, 3 Drawing Sheets

SYSTEM AND METHOD FOR GENERATING COMMODITY FLOW INFORMATION

CROSS REFERENCE TO RELATED APPLICATIONS

This application is a national phase application of PCT/US2009/048545, filed Jun. 25, 2009, which claims priority to U.S. Provisional Application Nos. 61/076,317, filed Jun. 27, 2008, 61/120,136, filed Dec. 5, 2008, 61/159,854, filed Mar. 13, 2009 and 61/162,008, filed Mar. 20, 2009, the disclosures of which are incorporated herein by reference in their entirety.

FIELD OF THE INVENTION

The present invention is in the field of communication and database systems and more particularly in the field of acquisition and presentation of global commodity flow data.

BACKGROUND OF THE INVENTION

At present, only certain amounts of discrete information regarding the global flow of various commodities is available in real-time or near real-time. Real-time or near real-time information is of particular interest to commercial traders, economists, and others. Maritime fleet managers may receive reports of ship positions and collect information regarding the disposition of their own ships and their respective cargos. However, this information is not largely publicly available and generally pertains only to specific vessels and is not associated with other data. Information regarding shipping traffic to and from various ports is typically gathered by port authorities and may be publicly available, however such information is often limited in geographic scope.

A large number of variables that affect the global flow of commodities are not accounted for by present maritime data providers in a manner that allows interested parties to receive accurate updates regarding projected arrival times for vessels and their cargos. For example, weather, political unrest, piracy, and even commodity pricing can cause vessels to alter course and speed. Further, data that incorporates these variables for accurately predicting worldwide flow of certain commodities involving virtually all shipping of those commodities around the world is not presently accessible to the interested parties such as traders of the subject commodities or economists interested in global economic trends. These interested parties are currently forced to rely on anecdotal, untimely, spotty reports, and incomplete modeling for the data sets they require.

Heretofore known systems and methods for tracking commodity flows have generally been directed to acquiring tactical information and have been limited in geographic scope. Typical existing systems are static and based on past ship movements, for example, but do not provide accurate information based upon current ship positions.

Heretofore known systems and methods for tracking commodity flows have focused on acquiring information from only one mode of transportation (e.g., pipelines) or a limited number of transportation modes. Typical existing systems do not provide an intermodal picture that combines data such as tracking of seaborne commodities in transit with cargo information collected from other transportation modes (e.g., pipelines, freight trains, trucks, and airplanes).

SUMMARY OF THE INVENTION

An illustrative embodiment of the present invention provides a global strategic picture of commodity movements by tracking ships from satellite and other sources and then combining ship location and movement information with a multitude of other vessel, port, and cargo data sets (the terms ship and vessel are used interchangeably herein). Ship positions are integrated with other data, such as vessel, port, cargo, weather, and market information, to create a global strategic picture of commodity flows. The global strategic picture provides detailed commodity flow information to interested parties such as commodities traders, freight traders, brokers, financial specialists, industry analysts, economists, supply chain managers, insurers, international financial markets, and governments. A global strategic picture is generated by combining (i) ship movements gathered by satellite and other sources, with (ii) vessel, port, cargo, weather, market, and other data from existing sources, and (iii) a time history of these data sets.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

An illustrative embodiment of the present invention is described with reference to FIG. 1, in which a global strategic picture is generated by combining (i) ship movements gathered by satellite and other sources, with (ii) vessel, port, cargo, weather, market, and other data from existing sources and (iii) a time history of these data sets. Such other sources of ship movement information may include the Lloyd's Register database by Lloyd's Register—Fairplay Limited of Surrey, United Kingdom, the AISLive database by AISLive Ltd., a United Kingdom-based company wholly owned by Lloyd's Register—Fairplay Limited of Surrey, United Kingdom, the Lloyd's MIU database by Lloyd's Maritime Intelligence Unit—Informa plc of London, United Kingdom, the Clarksons database by Clarkson Research Services Limited of London, United Kingdom, and the Q88 or Baltic99 databases by Heidenreich Innovations LLC, of Greenwich, Conn., U.S.A., for example.

Attention is drawn to the terms "ship location data," "vessel data," "cargo data," "port data," "weather data," and "market data." Ship location data include, but are not limited to, International Maritime Organization (IMO) number, Maritime Mobile Service Identity (MMSI) number, vessel name, current latitude/longitude, heading, course, speed, and navigational status (e.g., anchored, underway). Ship location data may be gathered by satellite-based Automatic Identification System (AIS) receivers, land-based AIS receivers, ship-based AIS receivers, Inmarsat-C GMDSS positions, Global Positioning System (GPS) positions, Long Range Identification and Tracking (LRIT) systems, ship-based weather reporting, object-oriented analysis of high-resolution satellite images, ship location self-reporting, radar, other ship-based receivers, and market intelligence on vessel movements (e.g., oil tanker sightings by port agents), as well as methods hereafter invented.

Vessel data include, but are not limited to, as IMO number, MMSI number, vessel name, vessel type, tonnage, cargo type(s), cargo capacity, draft, age, owner, operator, charterer, length of charter, mechanical history, inspection history, certifications, previous ports of call, departure time, loaded/empty status, expected port(s) of call, and estimated time(s) of arrival.

Port data include, but are not limited to, such information as cargo type(s), load/offload rates by cargo type or terminal, terminal capacity, storage capacity, harbor congestion, navigational status (e.g., accidents restricting terminal access), draft restrictions, and terminal owner/management contact information.

Cargo data include, but are not limited to, type of cargo (e.g., crude oil), subtype of cargo (e.g., grade of crude oil), amount of cargo in a storage facility, amount of cargo loaded on a vessel, broker data on charter fixtures, bills of lading, cargo manifests, certificates of origin, certificates of quality and quantity, master's receipt of samples, US Customs data, customs data from other countries, and tariff data.

Weather data include, but are not limited to, weather reports, weather forecasts, and information on hurricanes, typhoons, tropical storms, tsunamis, and other severe weather events.

Market data include, but are not limited to, commodity prices, spot market prices, futures prices, options prices, information on swaps, information on derivatives, supply or expected supply of certain commodities, demand or expected demand of certain commodities, information from exchanges (e.g., NYMEX), information from over-the-counter (OTC) trades, chartering rates, freight rates, economic data, economic trends, world trade data, export data, import data, security risks, market intelligence, market news, and market updates. Economic, trade, export, and import data are available at the local, state, national, regional, and/or international levels, and from public sources (e.g., official statistics) and/or private sources (e.g., data services provided by private companies, such as Bloomberg, IHS Global Insight, etc.)

With regard to loaded/empty status and cargo data, attention is also drawn to the term "likely," which means about 70% or greater accuracy when data are aggregated over a one-year time period.

Figure 1:
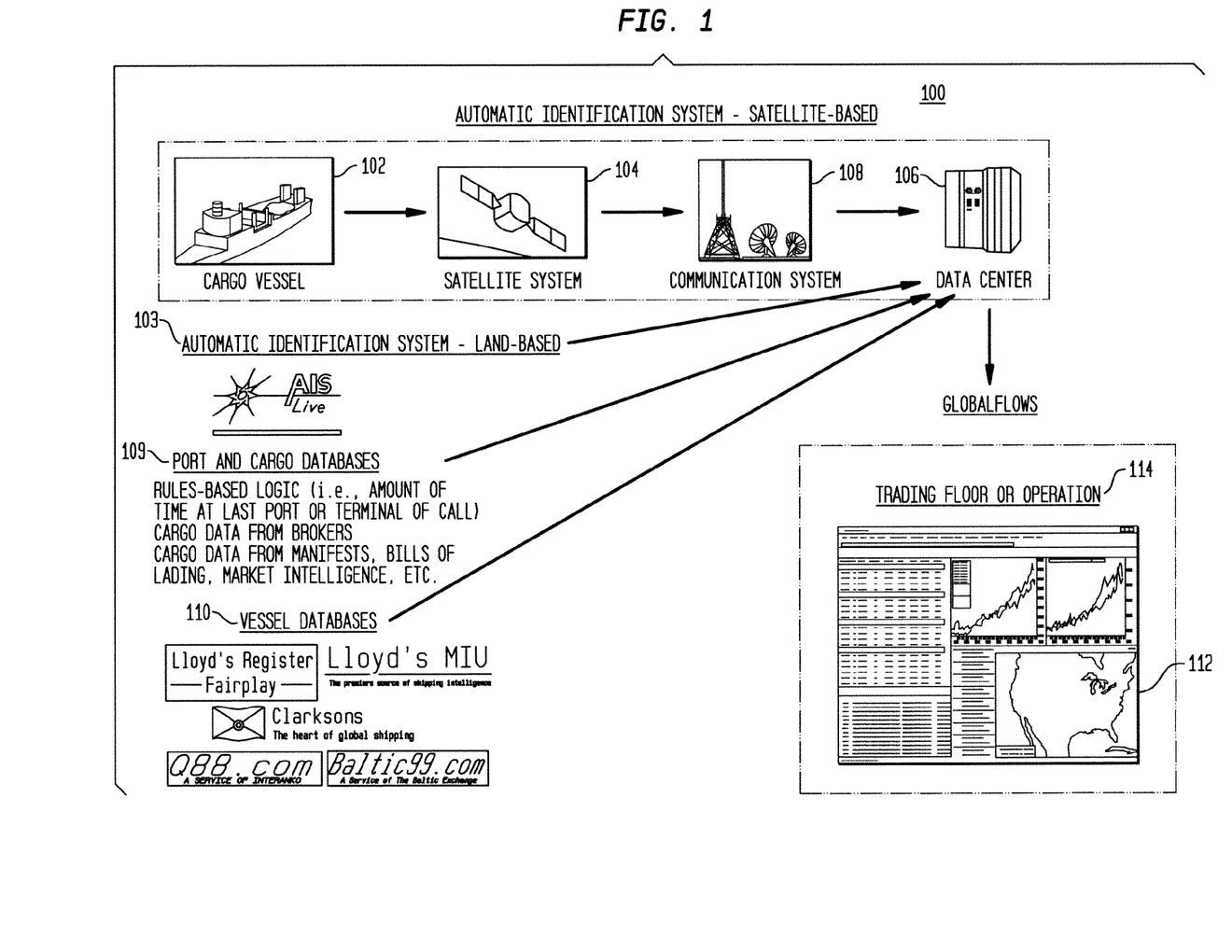
FIG. 1 is a system block diagram of a system for providing global shipping and cargo information according to an illustrative embodiment of the invention.

The illustrative embodiment of FIG. 1 includes a system 100 for providing global shipping and cargo information. The system 100 includes at least one vessel 102 having a position reporting device and at least one satellite 104 receiving vessel position information from the position reporting device or at least one land-based receiver 103 receiving vessel position information from the position report device. The system also includes at least one data center 106 receiving the vessel position information from the satellite 104 via a communication system 108 or receiving the vessel position information from the land-based receiver 103. The data center 106 combines the position information with at least one ship information database 110 and at least one ancillary database (e.g., port, cargo, weather, and market data) 109 to generate a global strategic picture 112 of the global shipping and cargo information. The system also includes a user computing device 114 in communication with the data center 106. The user computing device 114 receives the global strategic picture 112 from the data center.

Figure 2:
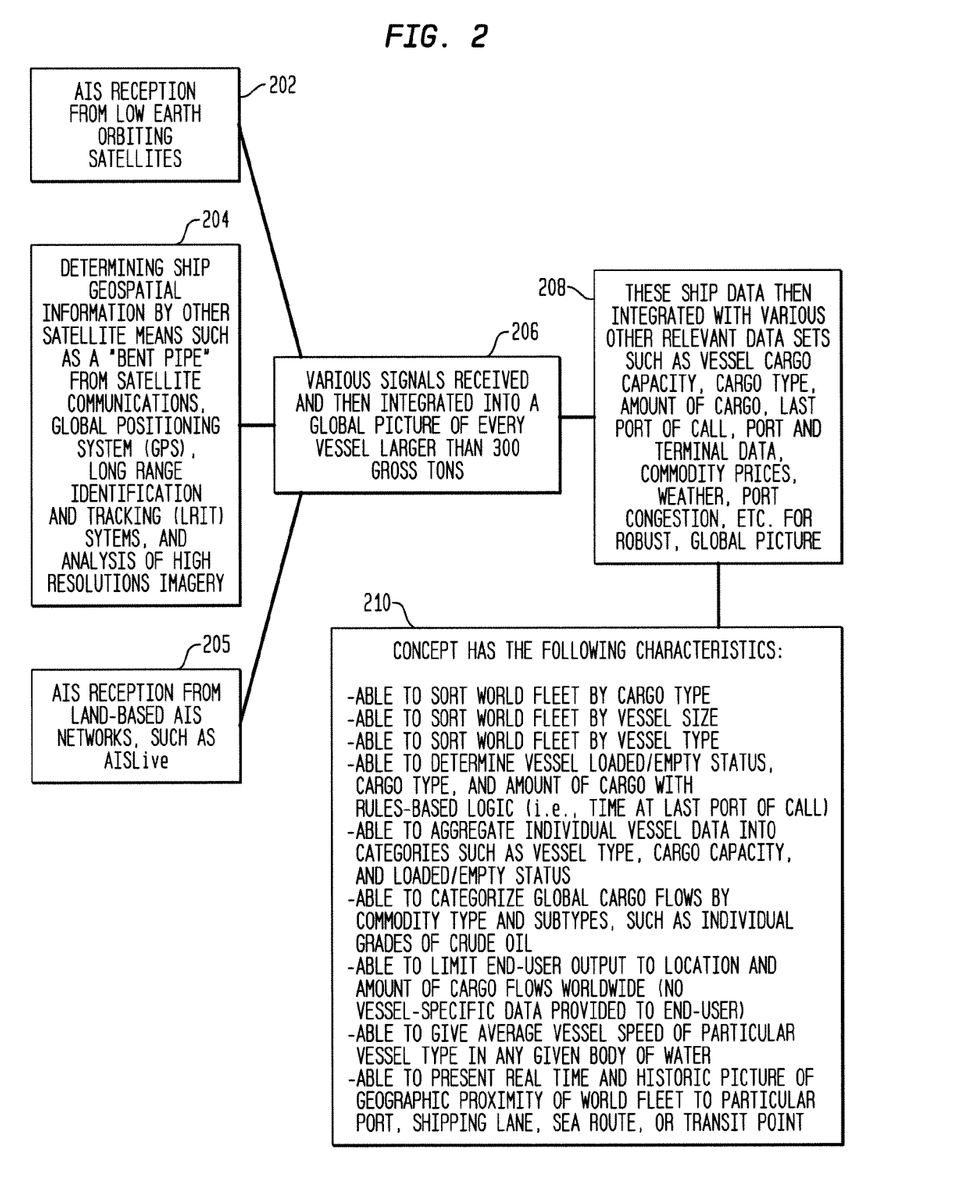
FIG. 2 is a process flow diagram describing a system and method for providing global shipping and cargo information according to a particular embodiment of the invention.

An illustrative implementation of the present invention is described with reference to FIG. 2 in which ship position information is received as AIS information from a low earth orbiting satellite 202. Ship geospatial information is determined 204 by other satellite means such as a satellite that permits voice communications using a single uplink frequency on one amateur band and a single downlink frequency on another amateur band known as "bent pipe" from satellite communications, GPS, LRIT systems, and object-oriented analysis of high resolution satellite images. Ship position information is also received as AIS information from land-based AIS networks 205, such as the AISLive database by AISLive Ltd., a United Kingdom-based company wholly owned by Lloyd's Register—Fairplay Limited of Surrey, United Kingdom. The various received signals are then integrated 206 into a global picture of every vessel larger than 300 gross tons. The ship data are then integrated with various other relevant data sets 208 such as vessel cargo capacity, cargo type, amount of cargo, previous ports of call, port and terminal data, commodity prices, weather, port congestion, etc. The illustrative implementation includes means for sorting world fleet information at once by cargo type, ship size, or vessel type; means to determine likely vessel loaded/empty status, likely cargo type and subtype, and likely amount of cargo with rules-based logic (e.g., particular ports are points of transfer for specific cargo, time a ship is located at a port of call as an indicator of whether there was time to fully or partially load a ship), means to aggregate individual vessel data into categories such as vessel type, cargo capacity, and loaded/empty status, means to categorize global cargo flows by commodity type and subtypes, such as individual grades of crude oil, means to provide average vessel speed for particular ships in any given body of water; and means to present a real-time picture and an historic picture of geographic proximity of a world fleet relative to a particular port, shipping lane, sea route, or transit point 210.

An illustrative embodiment of a global strategic picture can be thought of as a dynamic "data cube" with three axes—X-axis, Y-axis, and Z-axis—producing useful combinations of data moving through time. The X-axis of the data cube includes vessel, port, cargo, and other data from existing sources. These data may come from existing sources such as the Lloyd's Register, Lloyd's MIU, Clarksons and Q88 databases. The Y-axis of the data cube includes ship location data. These data will come from satellite sources, such as ORBCOMM and COM DEV, and other land-based sources, such as AISLive. In this example, the Z-axis of the data cube represents time.

The time history of ship movements and cargo information (including likely cargo information) is useful to create a record of commodity flows, allowing for statistical trend analysis. This is a useful contribution in part because one can study global commodity movements in hindsight, using data that is global in scope and comprehensiveness. This will contribute to all kinds of analyses, including how temperature swings, changes in economic conditions, changes in world trade, and geopolitical events affect the production, transportation, and importation of commodities, such as crude oil. This trend analysis will afford new insights into how global economies interact with each other as well as market intelligence into how economies will respond to shocks, disruptions, or other pressures in contrast to past observed global commodity movements. This statistical analysis will be both quantitative and qualitative, looking for micro- and macro trends based on the first worldwide data archiving of observed global fleet movements.

In one embodiment, subscribers may access these data through a web-based user interface and/or via an existing distribution network such as Reuters, Bloomberg, or PIRA Energy Group, for example. Subscribers can set parameters and filters to organize and search the data over a user-defined time period (e.g., based on the start of the trading day for their location, bi-daily, hourly, etc.). Users can generate value-added outputs such as the average speed of the crude oil tanker or LNG (liquefied natural gas) carrier fleet, how weather affects macro-ship movements, the physical location of all crude oil tankers or LNG carriers vis-à-vis spot markets, a macro-picture of port congestion, and market intelligence on time spreads between futures contracts for different months, value spreads between futures contracts for different grades of crude oil, OPEC exports of crude oil, non-OECD imports of crude oil, edge on EIA and OECD official statistics, and early notice on supply shocks or diversions of tankers between markets. The user interface software may present data in numerous formats such as (i) via a web-based interface, (ii) downloaded data presented in a spreadsheet user interface, such as Microsoft Excel, (iii) geospatially formatted data for a user interface such as Google Earth or Google Maps, and/or (iv) a live data feed.

One primary data source for ship geospatial information according to illustrative embodiments of the invention includes satellite reception of AIS transmissions from individual ships. ORBCOMM has installed AIS receivers on their newest constellation of low earth orbiting satellites. COM DEV has an existing AIS satellite. Additional AIS satellites are likely to be available soon. As presently configured, AIS data provides a vessel-specific IMO number, a vessel-specific MMSI number, a vessel call sign, and dynamic information from the ship's navigation systems including current latitude/longitude position, course, speed, destination, estimated time of arrival, previous ports of call, and navigational status (e.g., anchored). While AIS transmissions were originally intended for reception by local ground-based stations, reception of these transmissions by satellite according to illustrative embodiments of the present invention provides an improved method of maritime data collection for ships anywhere on earth.

Another data source for ship geospatial information according to illustrative embodiments of the invention include input from other ship positional data sources such as Inmarsat-C GMDSS positions, GPS positions, LRIT systems, ship-based weather reporting, object-oriented analysis of high-resolution satellite images, ship location self-reporting, radar, land-based AIS receivers, such as the AISLive network, ship-based AIS receivers, other ship-based receivers, and market intelligence on vessel movements (e.g., oil tanker sightings by port agents), among other sources. The shipping location information from various sources is then incorporated with a multitude of other data sets to create a new global picture of commodity flows.

Other data sets that can be incorporated with ship location information according to various embodiments of the invention include, but are not limited to, vessel, port, cargo, weather, and market data. Data can be aggregated for each combination of commodity type, ports of call, and ship type. Variance and standard deviation of each data field at the ship and aggregated level is also provided.

Figure 3:
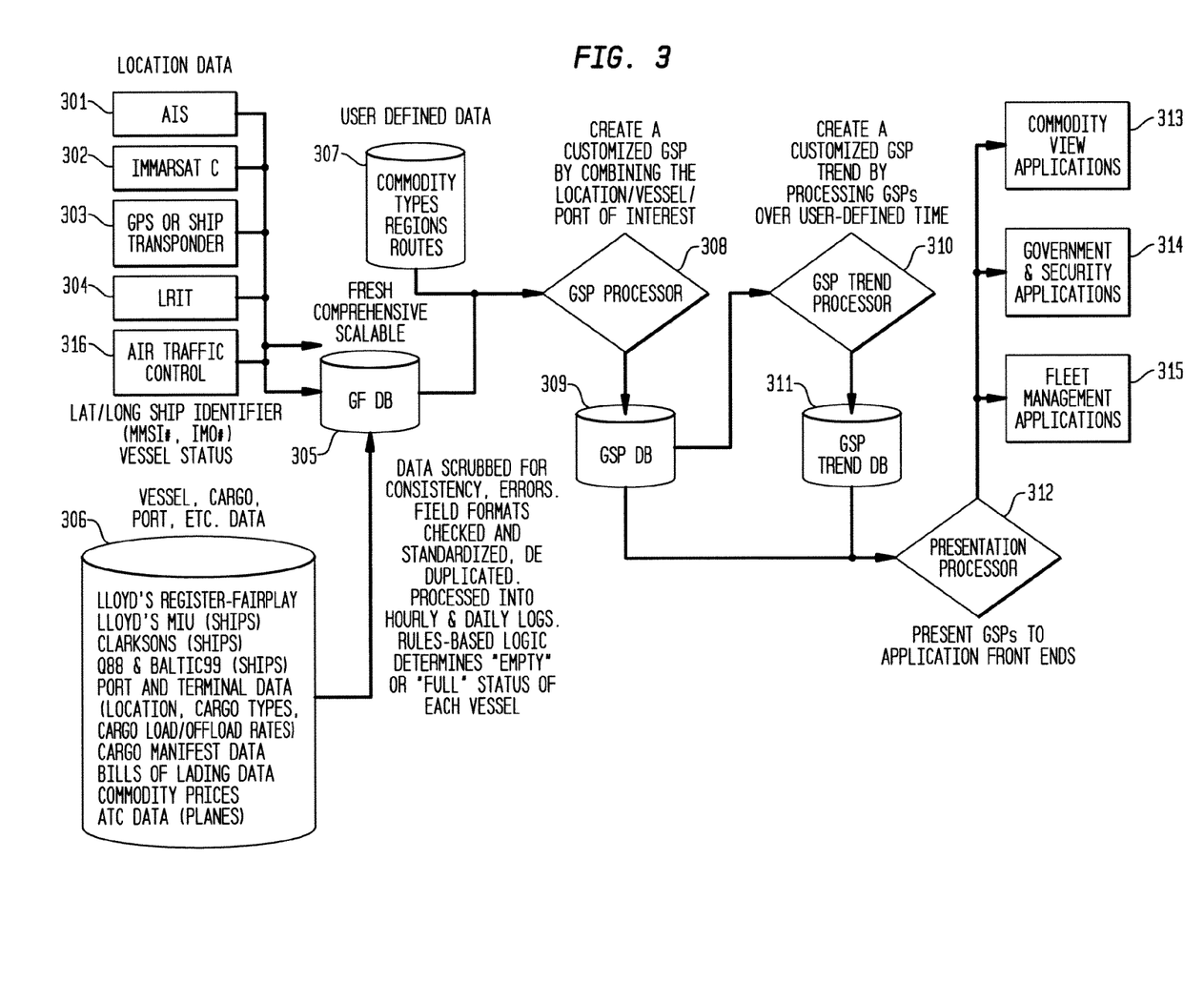
FIG. 3 is a more detailed system block diagram of a system for providing global shipping and cargo information according to various illustrative embodiments of the invention.

A particular embodiment of the invention which combines various data sources is described with reference to FIG. 3. Location data such as AIS data 301, Inmarsat C data 302, GPS or ship transponder data 303, LRIT data 304, and air traffic control data 316 is communicated to a first database 305. Location data takes the form of latitude/longitude data, which is linked to a specific vessel using a unique vessel identifier, such as MMSI number or IMO number. Vessel data, cargo data, and port data 306 such as Lloyd's Register—Fairplay ship information, Lloyd's MIU ship information, Clarksons ship information, Q88 and Baltic99 ship information, port and terminal data (e.g., location, cargo types, cargo load/offload rates), cargo manifest data, bills of lading data, commodity prices, air traffic control data and other port data is also communicated to the first database 305. The first database is scrubbed for data consistency and errors. Field formats are checked, standardized and de-duplicated. The first database is then processed into hourly and daily logs. Rules-based logic determines likely "empty" or "full" status of each vessel, and matches likely cargo data to each vessel. A global strategic picture (GSP) processor 308 combines data from the first database 305 with user defined data 307 such as commodity type information, route information, and region information to create a customized global strategic picture (GSP). The GSP is then stored in a GSP database 309 and can be accessed by a GSP trend processor 310. The GSP trend processor can create a customized GSP trend by processing GSPs over a user-defined time period. The GSP trend can then be stored in a GSP trend database 311. The GSP database 309 can also be accessed by a presentation processor 312 which presents the GSPs to various application front ends. Such applications include commodity view applications 313, government and security applications 314 and fleet management applications 315.

Embodiments of the invention provide commodity prices at various markets around the world. For example, LNG is currently traded in four markets: North American, European, NE Asian, and SE Asia. This invention will provide current spot market prices and futures market prices for a variety of commodities in various markets around the world. This supplements the global strategic picture of commodity movements.

Embodiments of the present invention provide a comprehensive real-time, or near real-time, global strategic picture of commodity movements. The picture is constantly updated, capturing the dynamic nature of international shipping.

Embodiments of the invention provide a real-time, as well as historical, global picture of world trade patterns and trends. This will provide data on local, state, national, regional, and international exports and imports in advance of available public sources (e.g., the release of official statistics) and/or private sources. This will be particularly valuable to economists, industry analysts, and equity researchers who specialize in understanding and predicting global economic trends and world trade patterns ahead of the market. For example, this will provide an early indication of which countries are experiencing significant increases or decreases in export and/or import volumes. Embodiments of the invention will also be valuable because the world trade and economic data will be collected using a different methodology than current sources (e.g., statistics gathered using surveys and interviews).

Embodiments of the invention provide software that allows a user to select a kind of cargo or product carried aboard ship to track/see. This is especially valuable for financial transactions such as trading, futures, derivatives, etc. on especially two kinds of cargo: 1) "wet bulk" such as crude oil, refined petroleum products, chemicals, etc. and 2) "dry bulk" such as agricultural products, metals, coal, steel, etc., although it would not be limited to these cargo types alone.

As non-limiting examples, embodiments of the invention will usefully consider the following vessel types to create a global or regional strategic picture of cargo flows, categorized by cargo type or vessel type: LNG carriers, liquefied petroleum gas (LPG) carriers, ethylene carriers, very large crude carrier (VLCC) tankers, ultra large crude carrier (ULCC) tankers, Suezmax tankers, shuttle tankers, Panamax tankers, Aframax tankers, handysize tankers, wine tankers, fruit juice tankers, water tankers, sulfuric acid tankers, phosphoric acid tankers, palm oil tankers, methanol tankers, m. sulfur tankers, m. phosphorus tankers, edible oil tankers, asphalt & bitumen tankers, bauxite bulkers, cement bulkers, chip bulkers, forest product bulkers, gypsum bulkers, limestone bulkers, lumber bulkers, ore bulkers, pipe bulkers, stone chip bulkers, etc.

Certain ships carry multiple cargoes. This invention resolves that issue by monitoring the time each vessel spends at each port, and matching that with the cargo type of that port and the load/offload rate. Other sources of cargo information for multi-cargo vessels include broker data on charter fixtures, bills of lading, vessel self-reporting, and personal communications with individual vessels, their owners, or operators.

Embodiments of the invention provide an abstract view of the global supply curve at any point in time for each combination of commodity type or types, port or ports of call, ship type or types, and date range. This will be valuable information for commodities traders, brokers, freight traders, industry analysts, economists, and other financial specialists, as well as owners, shippers, ship managers, port operators, supply chain managers, insurers, and others in the shipping business who could benefit from increased transparency in spot markets and futures markets for commodities, such as crude oil, natural gas, refined petroleum products, aluminum, copper, iron ore, lumber, etc.

Embodiments of the invention use rules-based logic, Bayesian logic, neural networks, learning algorithms, or other mathematical methods to integrate (i) data on vessel location for many or substantially all vessels in the world fleet, and (ii) data on vessel type, vessel cargo capacity, cargo type, and vessel tonnage with (iii) likely loaded/empty status and likely amount of loaded/offloaded cargo, to create a global strategic picture of commodity movements. Unique ship identifiers, such as MMSI numbers and IMO numbers, allow for integrating, aggregating, and filtering data by vessel location, vessel type, vessel cargo capacity, vessel tonnage, cargo type, likely amount of cargo, and likely loaded/empty status.

Embodiments of the invention use a rules-based logic to determine likely "loaded" or "empty" status for an individual vessel, based on that individual vessel's previous ports of call or another vessel engaged in lightering activities. For ports, likely loaded/empty status is determined by matching vessel location data with port location data over time. If a cargo vessel spends more than X number of hours at a certain export terminal, then the rules-based logic designates that vessel as "loaded" when it departs that export terminal. If a cargo vessel spends more than X number of hours at a certain import terminal, then the rules-based logic designates that vessel as "empty" when it departs that import terminal. In other embodiments "loaded" or "empty," or likely "loaded" or "empty," status can be determined by such methods as Bayesian logic, neural networks, learning algorithms, other mathematical methods, direct inquiry to owners, shippers or port personnel or by historic data (e.g., scheduled shipping) or additional contextual or inferential data (e.g., season, port, type of ship, market conditions etc.).

For example, if an LNG vessel stops for more than 6 hours at an LNG export terminal in Qatar, the rules-based logic designates that LNG vessel as "loaded" when it departs that export terminal. Similarly, if an LNG vessel stops for more than 6 hours at the LNG import terminal in Everett, Mass., the rules-based logic designates that LNG vessel as "empty" when it departs that import terminal.

The "loaded/empty status" rules-based logic combines the static latitude/longitude information of the export/import terminal, with the dynamic latitude/longitude position information for each vessel. Whether or not stated as "likely," the potential inferential status of such designations is acceptable for the practice of this invention.

Lightering involves a larger vessel offloading cargo on to a smaller vessel because of draft restrictions in a nearby port of call. For vessels engaged in lightering activities, loaded/empty status is determined by matching location data for the larger vessel with the location data for the smaller vessel over time. If a smaller vessel spends more than X number of hours (a number based on factors such as known or estimated capacity or displacement) alongside a larger vessel, then the rules-based logic designates the smaller vessel as "loaded" with the same cargo type as the larger vessel had.

Embodiments of the invention use each vessel's unique identifier (e.g., MMSI number) to match "loaded/empty status" with vessel data, such as vessel type, vessel cargo capacity, and vessel tonnage.

In addition to using the latitude/longitude points (or other global positioning reference points) for a certain export/import terminal, the "loaded/empty status" rules-based logic can use a pre-defined geographic area to determine the applicable export/import terminal. For example, the rules-based logic can use a proximity figure such as a 10-mile radius from a certain latitude/longitude point to define an expanded geographic area for an export/import terminal or another vessel engaged in lightering. After a vessel spends a minimum amount of time within that 10-mile radius, the rules-based logic determines loaded/empty status for that vessel.

When a vessel makes multiple ports of call at crude oil export or import terminals, "loaded" status may be represented by a percentage (e.g., 60% loaded).

Embodiments of the invention use a rules-based logic that combines time spent at a certain export/import terminal or another vessel engaged in lightering with the load/offload rate of cargo to determine the likely amount of cargo loaded/unloaded at the export/import terminal or another vessel engaged in lightering. For example, if a crude oil tanker spends six hours at a crude oil export terminal with a 10,000 barrel per hour load rate, the rules-based logic calculates that 60,000 barrels of oil were likely loaded on that tanker.

When a vessel makes multiple ports of call at crude oil export or import terminals, or vessels engaged in lightering, the load/offload rates at those terminals can be used to determine the likely percentage "loaded" status of that vessel (e.g., 60% loaded). For example, if a crude oil tanker leaves a crude oil export terminal in Saudi Arabia 100% loaded and offloads oil for 6 hours at a crude oil import terminal in Singapore on the way to delivering the rest of its crude oil at an import terminal in Ningbo, China, then the offload rate at the Singapore terminal can be used to calculate the likely remaining percentage of oil going to the Ningbo terminal.

Embodiments of the invention use cargo information for export terminals to determine what specific type of cargo is likely loaded on a vessel. Certain export terminals only export a certain type of a given cargo (e.g., a specific grade of crude oil). For example, if a crude oil tanker loads crude oil at Bonny Terminal in Nigeria, one can infer that the crude oil tanker has loaded Bonny Light crude oil because Bonny Light is the only crude oil exported from Bonny Terminal in Nigeria. This more detailed cargo information is valuable to crude oil traders because various grades of crude trade at different prices in commodity and futures markets.

It is to be appreciated that the properties of certain cargos must be considered in calculations of how much cargo is likely being carried by a particular vessel. For example, different grades of crude oil have different weights. Heavier grades of crude take more cargo space in crude oil tankers than lighter grades do and, thus, require a different calculation to convert cargo capacity from dead weight tons to barrels of oil. Rules-based logic, accounting for the different weights for each grade of crude, will calculate how much cargo or the maximum possible amount of a particular cargo that is likely aboard a particular vessel. In performing such calculations we make note of API gravity, a specific gravity scale developed by the American Petroleum Institute measuring the relative density of various petroleum liquids, expressed in degrees.

Embodiments of the invention use rules-based logic, Bayesian logic, neural networks, learning algorithms, or other mathematical methods to produce a useful estimate of how much of a certain type of cargo is being exported from a defined set of export terminals (aggregating shipments of that specific cargo departing those export terminals) over a defined time period, and track each cargo shipment over time to show the destination import terminal. For example, a rules-based logic allows a useful determination of aggregate crude oil exports from export terminals located within Organization of Petroleum Exporting Countries (OPEC) countries over a preceding two months, and can include quantitative data on deliveries to destination import terminals. These crude oil export data can then be compared to the official or other published statistics. In some instances, the concordance or disparities in data will offer useful market information both as to the volume of shipments and the accuracy of the various reports. Having an accurate picture of crude oil exports and imports as well as an "audit" assessment as to data sources provides interested parties with useful information, including supply indicia that may impact spot and futures prices of crude oil.

Embodiments of the invention use a rules-based logic, Bayesian logic, neural networks, learning algorithms, or other mathematical methods to produce a useful estimate of how much of a certain type of cargo is being imported into a user-defined set of import terminals (aggregating shipments of that specific cargo arriving at those import terminals) over a defined time period, and trace the historical track of each cargo shipment to show the origin export terminal. For example, a rules-based logic allows a useful determination of aggregate crude oil imports into import terminals located within India and China over the last two months, and trace the historical track of those crude oil shipments to their origin export terminals. These crude oil import data can then be compared to the official or other published statistics.

Embodiments of the invention analyze the height of vessels above water to estimate how much of a certain type of cargo is on board the vessel. Vessels laden with cargo sit low in the water, while vessels in ballast sit high in the water. Rules-based logic, Bayesian logic, neural networks, learning algorithms, or other mathematical methods may be used to estimate the amount of cargo in a specific vessel at a certain time, given that vessel's individual specifications and its current height above water. Vessel height above water can be detected by satellite, land-based, sea-based, or air-based surveillance systems, including remote sensing or visual observations by humans (e.g, by harbor masters or port agents), and web cams in ports or other locations.

Useful data by the process of this invention is also developed with limited the end-user output to certain data fields, such as the location (e.g., latitude/longitude) and amount of cargo in transit worldwide for a certain commodity type, such as crude oil. Particular note is made of data comprising unique vessel identifiers, such as MMSI numbers and IMO numbers, to integrate (i) vessel location data from satellite-based and land-based AIS networks, (ii) vessel data, (iii) loaded/empty status, cargo type, and amount of cargo from previous ports of call, and (iv) cargo, weather, market, and other data from brokers, charterers, shipowners, cargo manifests, bills of lading, and market intelligence. These data are then usefully aggregated worldwide and categorized by vessel type, likely cargo type, and likely loaded/empty status to show all cargo in transit for a certain cargo type, such as crude oil, but without providing individual vessel names or other vessel-specific data to end-users. Similarly, this data aggregation and categorization can show all available tonnage for a certain vessel type, such as crude oil tankers, but without providing individual vessel names or other vessel-specific data to end-users.

The foregoing functionality is useful in instances where security is a concern in offering market information without inclusion of sensitive vessel-specific information.

For example, an embodiment of the invention uses MMSI numbers to create a global picture of crude oil flows carried by likely "loaded" crude oil tankers. This involves using MMSI numbers to integrate (i) vessel latitude/longitude data for crude oil tankers received from satellite-based and land-based AIS networks, (ii) cargo capacity and vessel tonnage data for crude oil tankers from several sources, including Lloyd's Register—Fairplay, Lloyd's MIU, Clarksons, and Q88, (iii) loaded/empty status for crude oil tankers based on previous ports of call, crude oil grade data based on last crude oil export terminal, and amount of crude oil cargo based on time spent at last crude export or import terminal, and (iv) cargo, weather, market, and other crude oil data from brokers, charterers, shipowners, cargo manifests, bills of lading, and market intelligence. These data are then aggregated worldwide for all crude oil tankers and categorized by likely loaded/empty status, likely amount of crude oil on board, and likely crude oil grade to show all crude oil in transit worldwide. This embodiment of the invention records these data in a time history. This global picture of crude oil flows does not provide individual vessel names or other vessel-specific data to end-users, but remains valuable for crude oil traders, natural gas traders, refined products traders, freight traders, and other traders who trade commodities that are influenced by crude oil movements. This embodiment of the invention involve one or more of the following steps:

- Use MMSI# filter to limit the AIS data from the world fleet to only crude oil tankers.
- Use rules-based logic, Bayesian logic, neural networks, learning algorithms, or other mathematical methods to determine likely "loaded" status for each crude oil tanker (unique MMSI#) whose previous ports of call was a crude oil export terminal, and the likely crude oil grade loaded at that crude oil export terminal. When a crude oil tanker makes multiple ports of call at crude oil import terminals, likely "loaded" status may be represented by a percentage (e.g., 60% loaded).
- Integrate the cargo capacity of each "loaded" crude oil tanker (unique MMSI#) from the cargo capacity data from sources such as Lloyd's Register—Fairplay, Lloyd's MIU, Clarksons, and Q88. This involves matching likely "loaded" status with cargo capacity for each crude oil tanker (same unique MMSI#).
- Use rules-based logic, Bayesian logic, neural networks, learning algorithms, or other mathematical methods to determine the likely amount of crude oil loaded/offloaded on each "loaded" crude oil tanker (unique MMSI#) by combining time spent at a certain crude oil export/import terminal with the likely load/offload rate of crude oil at that export/import terminal.
- Use MMSI# to integrate the AIS data, including latitude/longitude information, for each "loaded" crude oil tanker (unique MMSI#) with the crude oil cargo data for that crude oil tanker (same unique MMSI#).

Aggregate the above to show latitude/longitude and likely amount of crude oil cargo for each "loaded" crude oil tanker. Each vessel-specific data combination receives a time stamp.

Aggregate these vessel-specific data combinations to show the latitude/longitude and likely amount of crude oil cargo for all "loaded" crude oil tankers worldwide.

Record the time history of this aggregated picture (likely loaded status, latitude/longitude information from AIS data, cargo capacity, and likely amount of crude oil on board).

Provide end-users with a global picture of crude oil flows, including a time history, without disclosing individual vessel names or other vessel-specific data.

Similarly, for example, an embodiment of the invention uses MMSI numbers to create a global picture of available crude oil tanker tonnage from "empty" crude oil tankers. This global picture of available crude oil tanker tonnage need not provide individual vessel names or other vessel-specific data to end-users, but remains valuable for freight traders and other traders who trade commodities that are influenced by available tanker tonnage. This embodiment of the invention involve one or more of the following steps:

Use MMSI# filter to limit the AIS data from the world fleet to only crude oil tankers.

Use rules-based logic, Bayesian logic, neural networks, learning algorithms, or other mathematical methods to determine the likely amount of crude oil offloaded from each crude oil tanker (unique MMSI#) by combining time spent at a certain crude oil import terminal with the likely offload rate of crude oil at that export/import terminal.

Use rules-based logic, Bayesian logic, neural networks, learning algorithms, or other mathematical methods to determine likely "empty" status for each crude oil tanker (unique MMSI#) whose previous ports of call was a crude oil import terminal, and whose amount of crude oil offloaded at its various stops at import terminals is within a threshold of that vessel's cargo capacity. Cargo capacity data are available from sources such as Lloyd's Register—Fairplay, Lloyd's MIU, Clarksons, and Q88.

Integrate the available vessel tonnage of each likely "empty" crude oil tanker (unique MMSI#) from the vessel tonnage data from sources such as Lloyd's Register—Fairplay, Lloyd's MIU, Clarksons, and Q88. This involves matching likely "empty" status with vessel tonnage for each crude oil tanker (same unique MMSI#).

Use MMSI# to integrate the AIS data, including latitude/longitude information, for each "empty" crude oil tanker (unique MMSI#) with the vessel tonnage for that crude oil tanker (same unique MMSI#).

Aggregate the above to show latitude/longitude and likely amount of available crude oil tanker vessel tonnage for each "empty" crude oil tanker Each vessel-specific data combination receives a time stamp.

Aggregate these vessel-specific data combinations to show the latitude/longitude and amount of available crude oil tanker vessel tonnage for all likely "empty" crude oil tankers worldwide.

Record the time history of this aggregated picture (likely empty status, latitude/longitude information from AIS data, and likely available crude oil tanker vessel tonnage).

Provide end-users with a global picture of available crude oil tanker vessel tonnage, including a time history, without disclosing individual vessel names or other vessel-specific data.

Embodiments of the invention provide a global picture of commodities in storage on vessels, such as crude oil being stored in oil tankers and motor vehicles being stored in pure car carriers. For crude oil, this phenomenon is referred to as floating storage. Floating storage tends to increase when crude oil prices are low and/or land-based crude oil storage facilities are at capacity or not available. Information on floating storage is valuable to crude oil traders, natural gas traders, refined products traders, freight traders, and other traders who trade commodities that are influenced by crude oil movements, because having an accurate picture of crude oil storage provides interested parties with useful information, including supply indicia that may impact spot and futures prices of crude oil.

Embodiments of the invention integrate sea routes into the geographical calculation of distances from vessels to ports. Sea routes can be pre-defined using standard preferred sea routes (e.g., the Suez Canal route from Asia to Northern Europe, which transits the China Seas, Malacca Strait, Indian Ocean, Gulf of Aden, Red Sea, Mediterranean Sea, and English Channel) or user-defined sea routes. Sea route calculations can be integrated from existing sources, such as the sea route software provided by AtoBviaC Plc (Berkhampstead, Hertfordshire, United Kingdom), or calculated manually and added to the rules-based logic that calculates distance from vessels to ports. The integration of sea routes into embodiments of the invention allow for more accurate calculations of transit time for an individual vessel or cargo movement to possible destination ports, from port of origin, or to or from other ports of interest.

Embodiments of the invention use rules-based logic, Bayesian logic, neural networks, learning algorithms, or other mathematical methods to impute the possible destination ports of a vessel by using vessel location, course, and speed, and by filtering possible destination ports by cargo type, vessel type, or loaded/empty status. For example, if a crude oil tanker is located in the North Atlantic, rules-based logic, Bayesian logic, neural networks, learning algorithms, or other mathematical methods can filter crude oil import terminals out of all the ports in the North Atlantic, calculate distances to each possible destination import terminal, and integrate relevant historical information (e.g., number of times the said crude oil tanker has called at each of the possible destination import terminals) to impute the likely destination import terminal. Rules-based logic, Bayesian logic, neural networks, learning algorithms, or other mathematical methods can also sort the possible destination ports according to the estimated probability of the individual vessel or cargo movement calling at each possible destination port.

If the ship location data is only available in irregular time intervals for a certain vessel, embodiments of the invention extrapolate the historic path of that vessel by connecting the dots between the ship location data from the two most recent signals. Thresholds are defined so that the extrapolation function does not go awry if incorrect or corrupted ship location data is transmitted.

Embodiments of the invention allow ship location data, vessel data, port data, cargo data, and other data (such as weather and market information) to be sorted geographically by port(s), country or countries, ocean basin(s), port pairs, country pairs, ocean basin pairs, sea route(s), and key transit points. Geographical parameters are capable of being set for each of the following categories:

Port(s): Sorting by port provides users with export/import information for an individual port or a set of ports.

Country or countries: Sorting by country provides users with export/import information for an individual country or a set of countries. For example, commodity traders can determine the aggregate oil exports from members of the Organization of Petroleum Exporting Countries. Similarly, for example, one can determine the aggregate oil imports to a user-defined set of countries, such as India, China, and South Korea.

Ocean basin(s): The geographic areas of certain ocean basins, such as the Baltic Sea, the Mediterranean, the Arabian Gulf, the North Atlantic, the North Pacific, and the Indian Ocean are defined. This would allow users to assess vessel/cargo flows within an ocean basin or set of ocean basins (e.g., within the Baltic Sea).

Port pairs: Users can assess vessel/cargo flows between two or more ports (e.g., from Das Island, United Arab Emirates to Everett, Mass.).

Country pairs: Users can assess vessel/cargo flows between two or more countries (e.g., from Russia to Canada).

Ocean basin pairs: Users can assess vessel/cargo flows between two or more ocean basins (e.g., between the Arabian Gulf and the North Sea).

Sea route(s): The geographic areas of certain sea routes, such as the trans-Pacific route, the trans-Atlantic route, and the Asia-to-Europe route are defined. This allows users to assess vessel/cargo flows along certain sea routes (e.g., along the Great Circle Route in the Pacific Ocean).

Key transit points: The geographic areas of certain sea routes, such as the Suez Canal, the Panama Canal, the Malacca Straits, the Strait of Gibraltar, the Bosporus, the English Channel, the Cape of Good Hope, and Cape Horn are defined. This allows users to assess vessel/cargo flows through certain key transit points (e.g., the Suez Canal).

Embodiments of the invention can be used by freight traders who trade on the availability of merchant vessels. The freight traders are provided with data on the supply of likely empty ("in ballast") vessels in a certain geographical area, such as two days away from Port X (based on average speed and course of each individual vessel). These data can be sorted by ocean basin, such as the North Atlantic or South China Sea. Using filters, freight traders can sort likely empty vessels using categories such as vessel type, vessel tonnage, vessel cargo capacity, and vessel age.

The supply data of likely empty vessels is combined with other data on vessel availability—such as ship owner, ship charterer, length of charters—to give freight traders information on the available supply of likely empty vessels. Using filters, freight traders can sort available likely empty vessels using categories such as vessel type, vessel tonnage, vessel cargo capacity, and vessel age.

In addition to providing freight traders with data on the supply and location of currently empty merchant vessels, analytics can be used to assess when a likely loaded ("laden") vessel would be able to reach a discharge port, unload its cargo, and return to a certain port or ocean basin in X days (based on average speed and historic routes of individual vessels). These data on individual likely loaded vessels could be aggregated to give a picture of the future supply of empty merchant vessels. For example, if a freight trader wants to trade on the availability of VLCC oil tankers in the Port of Jeddah, Saudi Arabia in 30 days, one can calculate which likely loaded merchant vessels could discharge their cargo in ports such as the Port of Rotterdam and, based on their average speed, could reach the Port of Jeddah within 30 days. Using filters, freight traders can sort such vessels using categories, such as vessel type, vessel tonnage, vessel cargo capacity, and vessel age.

The supply data of likely loaded vessels can be combined with other data on vessel availability—such as ship owner, ship charterer, length of charters, chartering rates, and freight rates—to give freight traders information on the available supply of laden vessels, and then use that information to calculate the future availability of empty merchant vessels. Using filters, freight traders can sort such vessels using categories such as vessel type, vessel tonnage, vessel cargo capacity, and vessel age.

When using filters, embodiments of the invention can also be used as a global fleet management tool. Such embodiments allow ship owners, management companies, shipping lines, etc. to track their worldwide fleets in real-time.

Embodiments of the invention are also is useful for port planning. The global strategic picture of commodity flows can help ports manage their operations and make more informed infrastructure investments as they would be able to see the actual shipping and cargo flows passing near their port.

Shippers and logistics companies focused on global supply chain management can use embodiments of the present invention to match their supply chain data with the global strategic supply database. This allows embodiments of the invention to incorporate at least part of the world's container fleet into the database. Many shippers are pursuing total supply chain visibility so they always know the location of their products. They use GPS transponders, RFIDs, etc. to track containers carrying their products. However these technologies do not work when the container is buried 30 boxes down in transit across the ocean because the signals are not strong enough to broadcast through the other containers. Embodiments of the present invention cure this deficiency by matching a shipper's global supply chain data with the MMSI number, IMO number or name of the ship carrying the container from Port A to Port B.

Another embodiment allows shippers to track the fleet of ships carrying their goods at any one time. Such shippers may not be interested in the other ships being tracked, but the parameters could be set in an application of the invention to show shippers only vessels carrying their goods.

Embodiments of the invention can be used by parties such as manufacturers and producers to track the global supply of any given commodity. This helps them better manage their manufacturing processes, inventory, and supply chain. For example, ALCOA could track the global flows of bauxite to ensure that they have sufficient inventory to keep their aluminum plants operating or, if there is a supply shock, to assess whether there are available alternative supplies in proximity to their aluminum plants affected by that shock.

Embodiments of the invention can be used by marine insurers to ensure insured vessels or cargos are transiting in only approved geographies. Certain marine insurance policies, such as hull & machinery insurance, cargo insurance, and war risk insurance, have special provisions that require additional premiums to be paid if a vessel enters a certain geographical areas. For example, the Joint War Committee of Lloyd's Market Association and the International Underwriting Association of London issues a list of risk areas on its website.

Embodiments of the invention can be used by banks and other lending institutions to track vessels and cargos that they have financed.

Embodiments of the invention keep a record of past ship and cargo flow movements, allowing for historical trend analyses of global ship and cargo flow movements. This is particularly valuable to commodities traders, freight traders, brokers, financial specialists, industry analysts, economists, supply chain managers, insurers, international financial markets, governments, and other parties interested in world trade patterns, exports, imports, global economic trends, and commodity movements.

A database of the present invention can sort data by geographic trading areas, including North Asia, SE Asia, Europe, and North America (exact geographical areas to be determined by market research). For example, X ships located in North Asia with Y cargo capacity and estimated transit times to A, B, C ports.

Users can set up customized alerts for certain events, such as when a vessel turns around, when a vessel makes significant deviation in current course, when a vessel makes significant speed change, when a vessel arrives in port, or when a vessel departs a port.

Other customized alerts deal with aggregated cargo in vessels. Embodiments of the invention allow users to select a cargo type of interest, such as crude oil, and then create customized alerts for that cargo type. Examples of customized alerts for crude oil include: when X million barrels of crude oil enters the Mediterranean Sea, when X million barrels of crude oil is within Y days sailing time for a user-defined port or set of ports, or when X million barrels of crude oil is exported from a user-defined port or set of ports over Z time period.

Embodiments of the invention allow users to create alerts of a supply disruption or anomaly of a user-defined commodity or cargo type (e.g., crude oil), or a user-defined set of commodities or cargo types. Such alerts can be selected from a pre-defined list of shocks or created with a user-defined set of parameters. Examples of alerts for crude oil include: when X million barrels of crude oil has been diverted or delayed by severe weather, when X million barrels of crude oil has been diverted or delayed by piracy or a terrorist attack, when X million barrels of crude oil has been diverted or delayed by a navigational hazard or obstruction in a key transit point (e.g., the Suez Canal), when X million barrels of crude oil has been diverted or delayed by a mechanical problem at a crude export terminal, or when X million barrels of crude oil has been diverted or delayed by a mechanical problem at a crude import terminal.

Embodiments of the invention allow users to create alerts that flag outliers from the historical data trends. Outlier alerts can be selected from pre-defined settings or customized with user-defined settings. Outliers can provide market intelligence that could be used for a trading advantage. For example, an alert can be triggered the first time that X million barrels of crude oil is imported into Y port during Z month. Outliers can also provide security intelligence that could be used for anti-piracy, anti-terrorism, drug interdiction, or other security purposes. For example, an alert can be triggered when a ship with an AIS signal is in a part of the ocean where it has not been before or where few ships have previously ventured. Such data is an indicator of possible contraband shipment. Such outlier alerts will account for seasonal variations in shipping patterns.

Embodiments of the invention allow users to create customized alerts based on pre-defined geographic areas, such as ocean basins, market areas, transit points, and ports. These geographic areas have pre-defined parameters and users can select the geographic areas of interest.

Embodiments of the invention allow users to create alerts based on customized geographic areas. Users can draw a polygon on a map that covers a specific geographic area, and then create customized alerts related to the geographic area designated by that polygon.

Embodiments of the invention notify users of alerts by email, text message, fax, automated phone calls, mobile phone application, web interface, data feed, or via a user-defined system.

Embodiments of the invention provide a sophisticated software filter combining AIS satellite information with existing shipping databases to provide comprehensive MDA. Governments can use embodiments of the present invention to achieve a critical security application called maritime domain awareness (MDA). Similar to tracking all aircraft in the sky by radar, MDA allows for tracking of all ships at sea to enforce applicable laws and regulations, and prevent nefarious activity, such as illegal fishing in restricted zones, catching polluters discharging prohibited substances (especially as a forensic tool), and catching smugglers of contraband, especially narcotics and human trafficking. Embodiments of the invention can be used to verify compliance with treaty obligations, such as the UN Convention on the Law of the Sea, maritime boundary treaties between countries, and treaties governing fishing in restricted areas.

Embodiments of the present invention can be used as a forensic tool, to enforce environmental regulations, such as illegal dumping, ship emissions control areas, etc. For example, embodiments of the invention could monitor and enforce ship emissions in the Sulfur Emission Control Areas (SECAs), designated by the IMO, where merchant vessels are required to use low-sulfur fuel, or, given a spill, determining which ship may have been the polluter.

There are homeland security applications of an effective MDA picture as well. Applications of the invention can be designed to receive amplifying information from government security sources such as classified intelligence and law enforcement data. These represent two examples of official, restricted data sets that could be added to the global strategic picture. In other words, this product could provide private sector platform on which the US Government, or other governments or authorities, add classified government intelligence and other information to create a more robust MDA picture.

Embodiments of the invention can integrate analysis of high-resolution satellite images and infrared satellite collection with satellite-based AIS data and land-based AIS data to provide a more complete strategic picture for maritime domain awareness. In this regard, advances in Artificial Intelligence offer useful computer based tools for data manipulation. Vessel, port, and cargo data from other sources can also be integrated into this maritime domain awareness picture, to provide a global strategic picture of vessel and cargo movements for security purposes.

Embodiments of the invention can be used to enforce the regulations of the IMO, the US Coast Guard, and other maritime enforcement agencies. For example, embodiments of the invention detect which vessels have incorrect MMSI numbers or incorrect IMO numbers in their AIS systems.

Embodiments of the invention can be used as a recovery tool to increase the marine transportation system's post-incident resiliency—after a disruption by terrorist attack, hurricane or other natural disaster, or human-related accident—by allowing officials to prioritize ship entry in the queue of waiting or approaching ships. Priority can be given to certain cargos, vessel types, or vessels with certain characteristics (e.g., shallow draft vessels that could avoid navigational hazards related to an incident). For example, in the event that severe weather disrupted the Boston area's natural gas pipeline system, the US Coast Guard could use applications of the invention to give priority to a waiting LNG carrier to dock at the LNG import terminal in Everett and, thus, avoid a power outage at the power plant next to the terminal.

Embodiments of the invention can match available post-incident port capacity with waiting or approaching vessels by comparing (i) port data, such as cargo facilities, storage capacity, and channel depth with (ii) vessel location data, and (iii) vessel data, such as cargo type, cargo capacity, and vessel draft.

Embodiments of the invention can improve post-incident intermodal efficiency by identifying which transportation modes—pipelines, rail, trucking, maritime, and air—have available capacity and which transportation modes suffer from temporary disruption. For example, after the 9/11 attacks, with land-based transportation systems disrupted, ferries and merchant vessels helped evacuate lower Manhattan.

Embodiments of the invention provide worldwide tracking of specific vessel(s) of interest, such as LNG carriers, vessel types carrying hazardous cargos, known USCG list of safety violators, suspect vessels known to be associated with nefarious activity, North Korean flagged vessels, etc. Combinations of high interest vessels can be tracked and live data streams of their location can be produced. Periodic watch lists can be generated in tabular form or a geospatial picture such as an overlay on Google Earth or Google Maps can be created according to illustrative embodiments.

Embodiments of the present invention can be used for distinguishing threats from legitimate commerce more quickly thereby improving national security resiliency. For example, deviations from normal cargo flows can alert intelligence officials to an elevated threat, allowing them to focus limited resources on suspicious activities by distinguishing them from legitimate commerce.

Embodiments can be used to monitor what vessels and cargo flows are arriving/leaving particular ports or countries of interest, such as Iran, North Korea, or known narcotics exporting locations, or for monitoring regulation of fishing fleets. For example, intelligence agencies can monitor how much of a certain cargo, such as grain, a given country imports offering inferential information on food production and the presence of famine.

Embodiments of the invention provide an additional safeguard to protect potential victims of piracy in dangerous waters. For example, intelligence agencies and anti-piracy patrols could track vessel types and cargo types in piracy risk areas to focus anti-piracy efforts on vessel types and cargo types that present an elevated risk of pirate attack (e.g., slow-moving laden oil tankers have a higher risk of being attacked by pirates than a fast-moving container vessel).

Embodiments of the invention can assist in search and rescue operations wherein software can help identify vessels in distress and assist in finding nearby ships to render assistance. Such embodiments are similar to AMVER, except ubiquitous and comprehensive thereby serving as a search and rescue tool to direct responding USCG assets and identify commercial vessels which may render assistance to a nearby ship in distress.

Scientists, environmentalists, industry and living marine resource managers can use the various embodiments of the invention to track and understand shipping's impact on the marine environment. For example, the IMO designates certain Sulfur Emission Control Areas (SECAs) where merchant vessels are required to use low-sulfur fuel.

In a future global cap and trade system and carbon market, ships will also be required to comply with established emission standards. Embodiments of the present invention allow for the policing of vessel exhaust discharge, where regulations require ships to burn cleaner fuels when near shore.

Embodiments of the invention can integrate the tracking of seaborne commodities in transit with cargo information collected from other transportation modes (such as pipelines, freight trains, trucks, and airplanes) to provide a global intermodal picture of commodity movements.

Embodiments of the invention integrate sea state into vessel speed calculations. Sea state influences the speed at which vessels may operate. For example, in heavy seas, vessels operate at a slower than normal speed. Integrating sea state into the invention provides a more accurate global picture of seaborne commodity movements for particular applications.

Embodiments of the invention can dynamically generate "license plates" or "unique signature" of critical attributes required for clients/customers out of the varied data streams through intelligent mining and search techniques.

EXAMPLES

Examples of the present invention may include a first illustrative embodiment which tracks the world's LNG carrier fleet and combines that ship location information with data on the LNG fleet from Lloyd's Register—Fairplay, Lloyd's MIU, Clarksons, and Q88. A second illustrative embodiment of the invention may add the world's crude carrier fleet—including Very Large Crude Carriers (VLCCs), Ultra Large Crude Carriers (ULCCs), and Suezmax tankers—to the LNG fleet. A third illustrative embodiment of the invention may add other vessel categories that carry only one cargo type, for example.

Database Examples

In an illustrative embodiment of the invention, data from disparate sources is integrated by creating a database that combines (i) ship location data from Orbcomm's AIS data, COM DEV's AIS data, and data from terrestrial-based AIS networks with (ii) vessel data from Clarksons, Lloyd's Register—Fairplay, Lloyd's MIU, Q88.com, and Baltic99.com, (iii) loaded/empty status, likely cargo type (e.g., grade of crude oil), and likely amount of cargo on board derived from a rules-based logic using last port of call and a list of dedicated export/import terminals (e.g., for crude oil) or vessels engaged in lightering, and (iv) cargo, weather, market, and other data from brokers, charterers, shipowners, cargo manifests, bills of lading, and market intelligence, for example.

The database is extensible to additional fleets and vessels, and to more data sources in the future (e.g., adding Lloyd's MIU and Q88 vessel data to the Clarksons and Lloyd's Register—Fairplay vessel data). The database is designed to allow for a time history of the various data combinations, providing the Z-axis in the data cube. The database is sortable to determine the current location (latitude/longitude), current course, and current speed of (i) the entire crude oil tanker fleet, (ii) only fully loaded crude oil tankers, (iii) only empty crude oil tankers, and (iv) partially loaded crude oil tankers (e.g., 60% loaded), for example.

The following exemplary list of crude oil grades and types illustrates the complexity of crude oil as a commodity, and the value of adding this cargo information into the global strategic picture of crude oil movements: Abu Bukhoosh, Al Shaheen, Alaska North Slope, Alba, Algerian Condensate, Amna, Anasuria, Arab Extra Light, Arab Heavy, Arab Light, Arab Medium, Arab Super Light, Ardjuna, Arun Condensate, Asgard, Attaka, Azadegan, Azeri Light, Bach Ho, Bachaquero, Balder, Basrah Light, BCF 17, Belayim Blend, Belida, Benchamas, Beryl, Bintulu Condensate, Bonny Light, Bontang Condensate, Boscan, Bouri, Bow River, Brass River, Brega, Brent Blend, Brent Sweet, Brunei Light, Cabinda, Canadon Seco, Cano Limon, Captain, Ceiba, Cerro Negro, Champion, Cinta, Cold Lake, Cossack, Cusiana, Daqing, Djeno, Doba Blend, Draugen, Dubai, Dukhan, Dulang, Duri, Ekofisk, Es Sider, Escalante, Escravos, Fife, Flotta, Foinaven, Forcados, Foroozan Blend, Forties, Fulmar, Furrial, Galeota Mix, Gippsland, Girassol, Glitne, Gryphon, Gullfaks, Handil Mix, Hanze, Harding, Heidrun, Hibernia, Iran Heavy, Iran Light, Isthmus, Jasmine, Jotun, Khafji, Kirkuk, Kittiwake, Kole, Kuito, Kutubu Blend, Kuwait, Labuan, Laminaria, Lavan Blend, Light Louisiana Sweet, Liuhua, Liverpool Bay, MacCulloch, Mandji, Maureen, Marib, Marlim, Mars Blend, Masila, Maya, Medanito, Minas, Miri, Mixed Blend Sweet, Murban, N'kossa, Nang Nuang, Nanhai Light, Napo, Nemba, NFC II, Nile Blend, Njord, Norne, NW Shelf Condensate, Olmeca, Oman, Oriente, Oseberg, Oso Condensate, Palanca Blend, Panyu, Pennington, Pierce, Plutonio, Poseidon Streams, Qatar Marine, Qua Iboe, Rabi, Rincon, Ross, Saharan Blend, Sakhalin II, Sarir, Schiehallion, Senipah, Seria Light Export, Shengli, Siberian Light, Siri, Sirri, Sirtica, Sleipner Condensate, Snorre, Souedieh, South Arne, Statfjord, Suez Blend, Syncrude Sweet Blend, Syrian Light, Tapis, Tempa Rossa, Tengiz, Terra Nova, Thamama Condensate, Tia Juana Heavy, Tia Juana Light, Triton, Troll, Turkmen Blend, Umm Shaif, Upper Zakum, Urals, Varg, Vasconia, Wafra, West Texas Intermediate, Widuri, Wytch Farm, Xikomba, Yoho, Zafiro, Zakum, Zarzaitine, Zuata Sweet, Zueitina, etc.

In addition to reporting current course and speed, the average course and average speed of each type of vessel (e.g., crude oil tankers) is calculated over X number of hours, as well as the average speed of the entire fleet for each type of vessel (e.g., crude oil tankers) over X number of hours. The average speed of the entire fleet for each vessel type (e.g., crude oil tankers) is disaggregated into the average speed of subsets of that fleet, such as (i) fully loaded vessels, (ii) empty vessels, and (iii) partially loaded vessels (e.g., 60% loaded). The average speed of the entire fleet for each vessel type (e.g., crude oil tankers), and its subsets (e.g., loaded crude oil tankers) is also disaggregated geographically by port(s), country or countries, ocean basin(s), port pairs, country pairs, ocean basin pairs, sea route(s), and key transit points. For example, the example embodiment can calculate the average speed of loaded crude oil tankers that departed ports in Saudi Arabia, the average speed of loaded crude oil tankers in the Indian Ocean, or the average speed of loaded crude oil tankers that transited the Suez Canal.

Interface Examples

In an exemplary embodiment of the invention, a geospatial interface uses a drop down menu to sort the visual display for (i) the entire world fleet, including options to display the world fleet for each type of vessel (e.g., crude oil tankers), (ii) only loaded vessels, including options to display only laden vessels for each type of vessel (e.g., crude oil tankers), (iii) only empty vessels, including options to display only empty vessels for each type of vessel (e.g., crude oil tankers), or (iv) partially loaded vessels, including options to display only empty vessels for each type of vessel (e.g., crude oil tankers).

In an example of a geospatial interface according to the invention, "loaded" and "empty" merchant vessels are color-coded triangles that point in the direction that the vessels are sailing (e.g., loaded vessels are green triangles, while empty vessels are white triangles). Different vessel types, such as crude oil tankers, can have different colors or symbols. It is to be appreciated that data presentation, including presentation by graphical user interface, is a rapidly developing area. The foregoing example is presented as a non-limiting illustrative example, and new data aggregation and presentation tools are being constantly made available.

In the example, clicking on a ship icon provides basic vessel information (ship name, cargo capacity, last port of call, average course over last hour, average speed over last hour). Clicking on a port icon provides basic port information (e.g., crude oil exports/imports over X time period, which would be calculated by the software by adding cargo capacity of crude oil tankers calling at crude oil export/import terminals over X time period). Clicking on a country provides basic import/export information (e.g., crude oil exports/imports over X time period). This would aggregate similar data from the country's crude oil export/import facilities.

The "X days from Y port information" can be geographically displayed with lines emanating from the ships on the screen to potential ports of call with estimated time of arrival calculated from average speed over the last Z hours, for example. For certain types of vessels, such as crude oil tankers, vessel type can be combined with port type to limit the number of potential ports of call. For example, a crude oil tanker in the North Atlantic would only have lines connecting to crude oil import facilities in North America and Europe.

The example interface has the capacity to block out certain sensitive areas for safety/security purposes, such as piracy hot spots near Somalia.

In another example interface, the entire world fleet for a commodity is represented in terms of volume of global supply and expected time to reach port. For example, from port of Houston, the short term supply picture for crude oil would be displayed as:
*35M barrels/1 day, 13 hours, 32 minutes
*125M barrels/3 days, 5 hours, 18 minutes
*64M barrels/8 days, 8 hours, 52 minutes
The time to destination would be updated based on recalculations of the route, average speed, and imputed destination of the ships as they come in.

Another functionality generates alerts when there is any substantial change in the short-term projections of supply. The user has the ability to define a threshold of change in volume of supply, expected time of arrival, or port of arrival such that the application generates an alert any time the forecast for the designated commodity changed above the threshold value. For example, the threshold value could be defined as a change in expected arrival time by more than 1 day. In the example above, if a hurricane in the Atlantic caused ships carrying the 125M barrels of crude oil to go to port.
Example output might be, in text form:
35M barrels/1 day, 13 hours, 32 minutes
Supply Shock Alert
→125M bbl/3 days, 5 hours, 18 minutes→now 125M bbl/6 days, 18 hours, 18 minutes→+3 days, 13 hours
64M bbl/8 days, 8 hours, 52 minutes
The illustrative embodiment of the invention would also generate a visual representation of the supply shock in graphical icons in the user interface.

Spreadsheet Functionality Examples

An illustrative embodiment of the invention provides an Excel spreadsheet functionality in which a bottom frame of the exemplary web-based user-interface includes several lists of boxes/categories to check (these lists of boxes/categories are outlined below). Note that spreadsheet is to be broadly construed to include any data aggregation graphic, including paper graphs and charts as well as "on-screen" type displays. Each user can check the desired boxes/categories, and then click a button to create an Excel spreadsheet presenting the results of their inquiry. The user can then manipulate the data however they like for the fields selected to generate the spreadsheet.

An example spreadsheet according to an illustrative embodiment is "fresh" at the time it was generated. The user can generate updated spreadsheets over time as new AIS data is gathered. Spreadsheets can also be generated manually according to the exemplary embodiment of the invention. In an automated embodiment, a user may create a customized search that delivers a particular Excel spreadsheet by email hourly, daily, or weekly.

An example spreadsheet can also provide the time history of ship and cargo flow movements, allowing users to conduct historical trend analysis of global ship and cargo flow movements.

Website Interface Examples

An exemplary website interface combines a Google Earth or Google Maps display with an Excel spreadsheet download interface. The Google Earth interface is illustratively provided on a top frame. The Excel spreadsheet download interface displays several groups of boxes/categories to check, which are downloadable in an Excel spreadsheet.

Core data appears at the bottom of Google Earth or Google Maps display. These data are sortable by vessel or cargo type. For example, for crude oil, the data appearing at the bottom of the Google Earth or Google Maps display may include:
 Average speed of loaded crude oil tanker fleet
 Total amount of crude oil cargo in transit at sea
 Total amount of crude oil tanker tonnage in ballast (empty crude oil tankers)
 Total amount of crude oil cargo exported in last 24 hours
 Total amount of crude oil cargo imported in last 24 hours Using a drop-down menu, users can display these data fields for other vessel types, such as LNG carriers, LPG carriers, product tankers, chemical tankers, bulk tankers, iron-ore carriers, bauxite carriers, grain carriers, livestock carriers, pure car carriers, lumber carriers, cruise ships, passenger vessels, etc.

Pop-up boxes appear on the geospatial interface when users click on a country, port, vessel, or ocean basin. These data are sortable by vessel or cargo type. For example, for crude oil, pop-up boxes will provide such data as:
 Country: crude oil imports/exports—24 hours, monthly, quarterly, annually
 Export facility: crude oil exports—24 hours, monthly, quarterly, annually
 Import facility: crude oil imports—24 hours, monthly, quarterly, annually
 Vessel: Name, cargo capacity, latitude/longitude, course, speed, last port of call
 Ocean basin: Average speed of loaded crude oil fleet, total amount of crude oil in transit, total amount of crude oil tanker tonnage in ballast
 Market area:
  Asian market area—NE Asia and SE Asia
  European market area
  North American market area Using a drop-down menu, users can display pop-up boxes for other vessel types.

Users can download vessel data in Excel spreadsheets. The user interface will allow users to check boxes of the data fields that they want, and then press a button to download those data in an Excel spreadsheet. Using a drop-down menu, users can sort the vessel data to download by vessel type. For example, users can download such data as the following for crude oil tankers:
 Crude oil tankers (vessel name, IMO number, MMSI number)
 Cargo capacity
 Loaded/empty/partially loaded status
 Vessel tonnage
 Current location (latitude/longitude)
 Current course
 Current speed
 Last port of call
 Destination port(s) (% of historical track record or imputed from rules-based logic)
 Average course over 24 hours, 72 hours, 7 days
 Average speed over 24 hours, 72 hours, 7 days, 15 days, 30 days, 90 days, year
 Average speed of loaded crude oil tanker fleet over 24 hours, 72 hours, 7 days, 15 days, 30 days, 90 days, year
 Average speed of empty crude oil tanker fleet over 24 hours, 72 hours, 7 days, 15 days, 30 days, 90 days, year
 Average speed of partially loaded crude oil tanker fleet over 24 hours, 72 hours, 7 days, 15 days, 30 days, 90 days, year
 Total amount of crude oil cargo in transit at sea
 Total amount of crude oil tanker tonnage in ballast
 Total amount of crude oil cargo exported in last 24 hours
 Total amount of crude oil cargo imported in last 24 hours The Excel spreadsheet can contain data fields for all individual crude oil tankers. It can also aggregate the data for the entire crude oil tanker fleet and subsets of the crude oil tanker fleet, such as loaded crude oil tankers, empty crude oil tankers, and partially loaded crude oil tankers. It can also aggregate or disaggregate geographically by port(s), country or countries, ocean basin(s), port pairs, country pairs, ocean basin pairs, sea route(s), and key transit points. For security purposes, the Excel spreadsheet can also remove vessel-specific information to show only the cargo movements associated with individual vessels.

Users can download cargo data in conventional spreadsheets (e.g., Excel). The user interface will allow users to check boxes of the data fields that they want, and then press a button to download those data in an Excel spreadsheet. Using a drop-down menu, users can sort the cargo data to download by cargo type, such as crude oil, or by vessel type, such as crude oil tankers. For example, users can download such data as the following for crude oil:
 Crude oil flows
 Flows of different crude oil grades
 Amount of crude oil on board each crude oil tanker
 Port of origin
 Destination port(s) (% of historical track record or imputed from rules-based logic)
 Historical record of latitude/longitude of individual crude oil movements
 Geographical location of individual crude oil movements (by ocean basin, sea route, key transit points, etc.)
 Geographical location of aggregated crude oil movements (by ocean basin, sea route, key transit points, etc.)
 Average course over 24 hours, 72 hours, 7 days
 Average speed over 24 hours, 72 hours, 7 days, 15 days, 30 days, 90 days, year
 Total amount of crude oil cargo in transit at sea
 Total amount of crude oil cargo exported in last 24 hours
 Total amount of crude oil cargo imported in last 24 hours The Excel spreadsheet can aggregate or disaggregate geographically by port(s), country or countries, ocean basin(s), port pairs, country pairs, ocean basin pairs, sea route(s), and key transit points.

Users can download port data in conventional spreadsheets (e.g., Excel). The user interface will allow users to check boxes of the data fields that they want, and then press a button to download those data in an Excel spreadsheet. Using a drop-down menu, users can sort the port data to download by port type, such as crude oil import facility, crude oil export facility, LNG import facility, LNG export facility, refined petroleum product port, chemical port, bulk port, container port, lumber port, automobile (pure car carrier) port, passenger terminal, etc. For example, users can download such data as the following for crude oil port facilities:

Crude oil ports (port name)
Export/import facility
Geolocation (latitude/longitude)
Loading/unloading capacity
Storage capacity
Crude oil exported/imported over last 24 hours, 72 hours, 7 days, 15 days, 30 days, 90 days, year These port data can also be aggregated and organized on the country level, the regional level, or according to a user-defined set of ports.

Users can download data organized by port pairs (e.g., vessel/cargo flows from Ras Tanura, Saudi Arabia to Houston, Tex.) in conventional spreadsheets (e.g., Excel). The user interface allows users to check boxes of the port pairs that they want, and then press a button to download those data in an Excel spreadsheet. Using a drop-down menu, users can sort port pair data to download by port type, such as crude oil import facility. For example, users can download such data as the following for crude oil port pairs:

Crude oil export terminals first column (port name)
Crude oil import terminals first row (port name)
The amount of crude oil cargo moving from export to import facilities.
The crude oil tankers moving between export and import facilities.
The aggregated crude oil tanker tonnage moving between export and import facilities.

These port pair data could also be aggregated and organized on the country level, which would provide users with the amount of cargo or vessel tonnage flow between two or more countries, the regional level, or between a user-defined set of ports.

Users can download data organized by ocean basin, ocean basin pairs, sea route, and key transit point in conventional spreadsheets (e.g., Excel). The user interface will allow users to check boxes of the data fields that they want, and then press a button to download those data in an Excel spreadsheet. Using a drop-down menu, users can sort the data to download by categories. The drop-down menu will also allow users to sort the data by cargo type, such as crude oil, or by vessel type, such as crude oil tankers. For example, users can download such data as the following for categories of interest:

Individual vessel names
Individual vessel IMO numbers or MMSI numbers
Cargo capacity, by vessel and aggregated for fleet
Laden/in ballast/partially full status
Amount of crude oil on board each vessel
Tonnage, by vessel and aggregated for fleet
Current location (latitude/longitude)
Current course
Current speed
Last port of call
Destination port(s) (% of historical track record or imputed from rules-based logic)
Average course over 24 hours, 72 hours, 7 days
Average speed over 24 hours, 72 hours, 7 days, 15 days, 30 days, 90 days, year
Average speed of loaded crude oil tanker fleet over 24 hours, 72 hours, 7 days, 15 days, 30 days, 90 days, year
Average speed of empty crude oil tanker fleet over 24 hours, 72 hours, 7 days, 15 days, 30 days, 90 days, year
Crude oil port facilities Users can also create customized alerts for individual vessels, types of vessels, types of cargo, weather, port congestion, market data, economic data, export data, import data, world trade patterns, and other trends or events. The following list provides some examples:

Supply shock in a certain commodity
Deviation in expected arrival time of certain commodity flows exceeds a user-defined threshold
Cargo amount of a certain commodity in a user-defined geographical area exceeds a user-defined threshold
Cargo amount of a certain commodity in an ocean basin exceeds a user-defined threshold
Cargo amount of a certain commodity on a sea route exceeds a user-defined threshold
Cargo amount of a certain commodity passing through a key transit point exceeds a user-defined threshold
Deviation in expected arrival time of a vessel exceeds a user-defined threshold
Vessel turns around
Vessel makes significant deviation in current course
Vessel makes significant speed change
Vessel anchors in a harbor to engage in floating storage
Vessel engaged in floating storage starts moving to market
Port arrival by certain type of vessel
Port departure by certain type of vessel
World trade increases or falls by X % over a user-defined time period
Trade from a user-defined local, state, national, regional, or international geographic area increases or falls by X % over a user-defined time period
Exports from a user-defined local, state, national, regional, or international geographic area increases or falls by X % over a user-defined time period
Imports from a user-defined local, state, national, regional, or international geographic area increases or falls by X % over a user-defined time period While the invention has been described with reference to illustrative embodiments, it will be understood by those skilled in the art that various other changes, omissions, and/or additions may be made and substantial equivalents may be substituted for elements thereof without departing from the spirit and scope of the invention. In addition, many modifications may be made to adapt a particular situation or material to the teaching of the invention without departing from the scope thereof Therefore, it is intended that the invention not be limited to the particular embodiment disclosed for carrying out this invention, but that the invention will include all embodiments, falling within the scope of the appended claims. Moreover, unless specifically stated any use of the terms first, second, etc., do not denote any order of importance, but rather the terms first, second, etc. are used to distinguish one element from another.

What is claimed is:
1. A system comprising:
a server receiving and combining vessel position information for a vessel, vessel identification and characteristic information for the vessel and port data associated with a port, wherein:

the vessel position information for the vessel is determined from at least one of an automatic identification system (AIS) message from the vessel and an image of the vessel;

the vessel identification and characteristic information for the vessel comprises at least one of a vessel type of the vessel, a name of the vessel, a number associated with the vessel, a status of the vessel, a size of the vessel, and a capacity of the vessel; and the port data associated with the port comprises at least one of an operational status of the port, a position of the port, a capacity of the port, a size of the port, a number and location of berths within the port, draft restrictions at the port, cargos handled by the port, and cargos handled by the berths within the port; and a module, operating on the server, configured, based on the vessel position information and at least one of the vessel identification and characteristic information and the port data, to perform one or more operations comprising:
inferring a loaded or empty status of the vessel;
inferring a cargo type for cargo on the vessel;
quantifying an amount of cargo on the vessel;
aggregating the amount of cargo on multiple vessels;
estimating one of an origin and a destination of the vessel; and
measuring a quantity of vessels.

2. The system of claim 1, wherein the server combines the vessel position information, the vessel identification and characteristic information, the port data associated with the port and one of the cargo type and the amount of cargo to quantify maritime trade.

3. The system of claim 2, further comprising:
cargo information software executable on a cargo information processor to receive input data comprising at least one of the vessel position information, a vessel speed for the vessel, a vessel course for the vessel, a fleet average speed, a port of origin for the vessel, a destination port for the vessel, or a time at port for the vessel, the cargo information software being adapted to combine the input data with known vessel patterns to quantify the maritime trade.

4. The system of claim 3, further comprising:
software executable on a processor in communication with a data center, the software receiving input comprising at least one of the vessel position, the vessel speed, the vessel course, the cargo information comprising one of the cargo type and the amount of cargo, the average fleet speed, the port data, or weather information to quantify the maritime trade.

5. The system of claim 2, wherein the server further quantifies the maritime trade based on historical information associated with one of the vessel position information the vessel identification and characteristic information, and the port data.

6. The system of claim 2, wherein the server is further adapted to combine weather information received from a weather database with the vessel position information and the port data to quantify the maritime trade.

7. The system of claim 2, further comprising:
a vessel position processor in communication with the server, the vessel position processor adapted to periodically receive the vessel position information and generate corresponding vessel speed information and vessel course information for use when quantifying the maritime trade.

8. The system of claim 7, wherein the vessel position processor is further adapted to generate an average speed of a predetermined plurality of vessels.

9. The system of claim 2, further comprising:
a user defined data module in communication with the server, the user defined data module adapted for receiving information from a user for use when quantifying the maritime trade.

10. The system of claim 2, further comprising:
a processor in communication with the server, the processor adapted to receive the quantity of the maritime trade and generate user defined trend information for use when quantifying the maritime trade.

11. The system of claim 2, wherein the maritime trade comprises at least one of (1) import data to and from a geospatial area, (2) export data to and from the geospatial area or (3) vessel movement on a sea route.

12. The system of claim 11, wherein the geospatial area comprises a country.

13. The system of claim 1, further comprising:
a presentation processor in communication with the server and a communication device, the presentation processor adapted to generate a user interface presentation comprising at least one of a commodity view application, a security application, or a fleet management application.

14. The system of claim 1, further comprising:
a complementary vessel position data source in communication with the server to supplement the vessel position information.

15. The system of claim 1, further comprising a processor for sorting a global fleet of vessels by the cargo type.

16. The system of claim 1, wherein the server sorts a global fleet of vessels by ship size or ship type.

17. The system of claim 1, wherein the server generates one of an average vessel speed, ship types or ships in a given body of water.

18. The system of claim 1, wherein the server generates proximity information for vessels in a global fleet of vessels relative to an identified location.

19. The system of claim 1, wherein the server combines the vessel position information and the vessel identification and characteristic information to quantify shipping activity of a plurality of vessels.

20. The system of claim 19, wherein the server further comprises:
a second module configured to:
receive input data comprising at least one of the vessel position information, a vessel speed for the vessel, a vessel course for the vessel, a fleet average speed, a port of origin for the vessel, a destination port for the vessel, or a time at port for the vessel; and
combine the input data with known vessel patterns to generate a quantification of the shipping activity of the plurality of vessels.

21. The system of claim 9, wherein the shipping activity comprises one of first data associated with ships entering or leaving a geospatial area, second data associated with ships moving on sea routes, or third data associated with ships idling.

22. The system of claim 21, wherein the geospatial area comprises one of a port and a country.

23. A method comprising:
receiving and combining, at a server, vessel position information for a vessel, vessel identification and characteristic information for the vessel and port data associated with a port, wherein:

the vessel position information for the vessel is determined from at least one of an automatic identification system (AIS) message from the vessel and an image of the vessel;

the vessel identification and characteristic information for the vessel comprises at least one of a vessel type of the vessel, a name of the vessel, a number associated with the vessel, a status of the vessel, a size of the vessel, and a capacity of the vessel; and the port data associated with the port comprises at least one of an operational status of the port, a position of the port, a capacity of the port, a size of the port, a number and location of berths within the port, draft restrictions at the port, cargos handled by the port, and cargos handled by the berths within the port;

based on the vessel position information and at least one of the vessel identification and characteristic information and the port data:
   inferring a loaded or empty status of the vessel;
   inferring a cargo type for cargo on the vessel;
   quantifying an amount of cargo on the vessel;
   aggregating the amount of cargo on multiple vessels;
   estimating one of an origin and a destination of the vessel; and
   measuring a quantity of vessels.

24. A system comprising:

a processor; and a computer-readable storage device storing instructions which, when executed by the processor, cause the processor to perform operations comprising:
   tracking historical vessel position information for a vessel;
   tracking historical vessel identification and characteristic information for the vessel;
   tracking historical port data associated with changes over time to characteristics of a port; and
   based on one or more of the historical vessel position information, the historical vessel identification and characteristic information and the historical port data, performing one or more of operations comprising:
      inferring a load or empty status of the vessel;
      inferring a cargo type for cargo on the vessel;
      quantifying an amount of cargo on the vessel;
      aggregating the amount of cargo on multiple vessels;
      estimating an origin and a destination of the vessel; and
      measuring a quantity of vessels.

\* \* \* \* \*